United States Patent

Sakaguchi et al.

[11] 4,029,304
[45] June 14, 1977

[54] SHOCK ABSORBER FOR BUMPERS

[75] Inventors: Takumi Sakaguchi; Toshifumi Yamamoto, both of Gyoda, Japan

[73] Assignee: Showa Manufacturing Co., Ltd., Tokyo, Japan

[22] Filed: May 30, 1975

[21] Appl. No.: 582,222

[30] Foreign Application Priority Data

Dec. 26, 1974 Japan .............. 50-148442

[52] U.S. Cl. .............. 267/64 R; 267/116
[51] Int. Cl.² .............. F16F 9/346
[58] Field of Search .............. 293/1, 60, 70, 84, 85, 293/87, 88, 68, 79, 101, 71; 267/64 R, 116, 139, 186, 64 A, 65 R; 213/43, 1 A, 223, 41, 64 R; 188/286, 297, 322, 316

[56] References Cited

UNITED STATES PATENTS

| | | | |
|---|---|---|---|
| 3,139,989 | 7/1964 | Thornhill | 213/223 |
| 3,190,458 | 6/1965 | Zanow | 213/223 X |
| 3,341,189 | 9/1967 | Rumsey | 213/43 X |
| 3,412,870 | 11/1968 | Rollins | 213/43 X |
| 3,722,640 | 3/1973 | Taylor | 188/316 |
| 3,853,311 | 12/1974 | Kreuzer et al. | 267/116 X |
| 3,860,225 | 1/1975 | Kaisha | 267/64 R |
| 3,870,287 | 3/1975 | McMahon | 267/65 R X |
| 3,933,344 | 1/1976 | Taylor | 188/322 X |

*Primary Examiner*—Stanley H. Tollberg
*Assistant Examiner*—Norman L. Stack, Jr.
*Attorney, Agent, or Firm*—A. W. Breiner

[57] ABSTRACT

A shock absorber for bumpers comprising a fixed bottomed outer cylinder and an inner cylinder which is slidably fitted in said outer cylinder and to the front end of which a bumper is to be fitted, said outer cylinder being provided with a stopper to prevent the inner cylinder from escaping and said inner cylinder being slidably fitted with a piston having damping force generating holes, filled with a compressible fluid and engaged with said stopper, said fluid being compressed by pulling a piston rod connected with the piston in the end part through the base end of the inner cylinder so as to collide with the bottom surface of the outer cylinder to press the inner cylinder into the outer cylinder.

4 Claims, 3 Drawing Figures

SHOCK ABSORBER FOR BUMPERS

This invention relates to shock absorbers for bumpers to absorb shocks caused by collisions of automobiles or the like. Such shock absorbers have been conventionally used together with outside metal springs and therefore not fully acceptable in that the bumper is complicated and large in the assembled structure. Further, it is known that a spring characteristic can be given to the shock absorber by enclosing a compressible liquid within the shock absorber but, in order to keep the bumper always stable, the liquid must be kept compressed by applying a pressure to it. Therefore, they have disadvantages in that the shock absorber is complicated in the structure and is not easy to assemble.

An object of the present invention is to provide a shock absorber which is made very simple and small in the mechanism of fitting to a bumper without such disadvantages.

Figure 1:
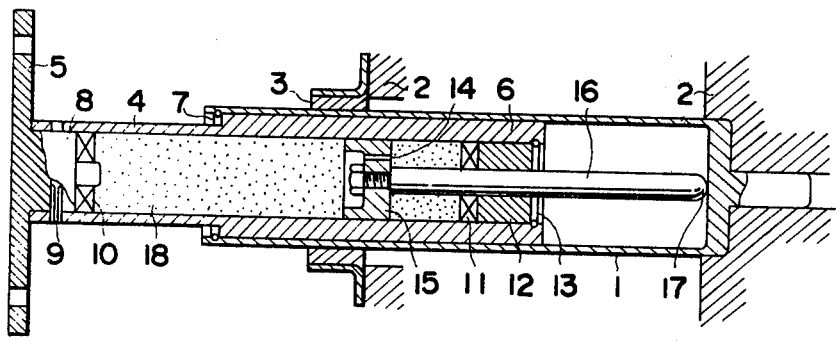
FIG. 1 is a vertically sectioned view of a shock absorber embodying the present invention.

In FIG. 1 which is a vertically sectioned view of an embodiment of the present invention, a bottomed outer cylinder 1 is fixed at the base part to a car body 2 and is held at the front end to said body through a rubber cylinder 3 and an inner cylinder 4 is to have a bumper fitted to a bracket 5 at its front end. A piston 6 formed at the base end of cylinder 3 and in the middle part, is slidably fitted in the above mentioned outer cylinder 1 and is prevented from escaping or pulling out by stopper 7 having a snap ring fitted to the inside surface of the front end of the outer cylinder 1. The above mentioned bracket 5 has a projection 8 fitted to the front end of the inner cylinder 4 and fixed with a pin 9. An oil seal 11 and rod guide 12 are fitted at the base end of the inner cylinder 4 and are prevented from escaping or pulling out with a snap ring 13. A piston 15 having damping force generating holes 14 is slidably fitted in the inner cylinder and its piston rod 16 is pulled by the end part 17 out of the center holes of the above mentioned oil seal and rod guide.

A compressible fluid 18 such as a silicon oil more or less compressed is enclosed in inner cylinder 4 and the piston 15 is held in a position more or less separated from the oil seal 11 by pressing the piston rod at the end part 17 in contact with the bottom surface of the outer cylinder 1.

Figure 2:
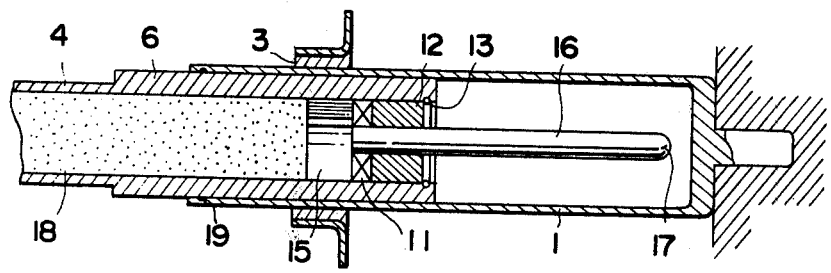
FIG. 2 is a vertically sectioned view of a part of the shock absorber in FIG. 1 during the assembly.

In FIG. 2 which is a vertically sectioned view of a part of such shock absorber as is described above at the time of assembling it, first of all, when the inner cylinder 4 with the piston 15 in contact with the oil seal 11 is filled with a silicon oil 18 so that no air gap may be produced, is fitted in the outer cylinder 1 so that the piston rod may collide in the end part 17 with the bottom surface of the outer cylinder and is further strongly pushed in this state into the outer cylinder 1, the piston 15 will separate from the oil seal 11 as in FIG. 1 and the silicon oil 18 will be compressed by the volume of the piston rod inserted into the inner cylinder. Therefore, when the piston 6 formed on the outside surface of the inner cylinder 4 has passed a snap ring groove 19 in the outer cylinder and a snap ring 7 in FIG. 1 is fitted in the groove, the above mentioned piston 6 will be pressed into contact with the snap ring 7 by the resiliency of the silicon oil 18 so that the inner cylinder may be prevented from escaping. Such shock absorber is fixed to the car body 2 and a bumper is fitted to the bracket 5.

Figure 3:
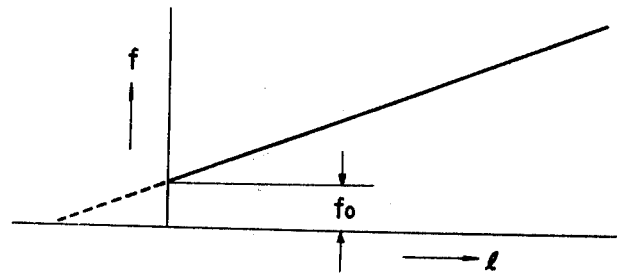
FIG. 3 is a diagram showing the characteristics of the shock absorber according to the present invention.

In FIG. 3 which is a diagram showing the characteristics of such shock absorbers as is described above, the moving distance $l$ of the bumper is taken on the abscissa and the reactive force $f$ applied on said bumper is taken on the ordinate. That is to say, when the bumper is stationary and therefore the distance $l$ is zero, a force $f_o$ will be applied to the inner cylinder 4 fitted with the above mentioned bumper and said inner cylinder will be pressed in contact with the stopper 7 in the outer cylinder by this force. Therefore, the bumper will be fitted to the body 2 so stably as not to rock and therefore will not be likely to issue noises with vibrations. Further, when a large shock is applied to the bumper by a collision, the inner cylinder 4 will move rightward in FIG. 1 to further compress the fluid 18 and the reactive force applied to the bumper by the pressure of this fluid will rise as in FIG. 3. With the movement of the inner cylinder 4, the fluid on the left side of the piston 15 will move to the right side through the holes 14. A damping force will be generated by the flow resistance of this fluid and the shock energy will be absorbed by the pressure of the above mentioned fluid and this damping force.

As mentioned on the above embodiment, the shock absorber of the present invention has a very simple structure and is formed to be small. The bumper can be stably fitted by compressing the fluid by only pushing the piston rod against the bottom surface of the outer cylinder to press the inner cylinder so as to be engaged with the stoppper in the outer cylinder and therefore the assembly of the shock absorber is very easy.

What is claimed is:

1. A shock absorber for bumpers comprising an outer cylinder with opposed ends having means for attachment to a car body, said outer cylinder provided at one of its ends with a closed bottom surface and at its other end with an opening, an inner cylinder slidably fitted into said opening in said outer cylinder and having means at its front end to which a bumper is to be fitted, a projection provided on the outer periphery of said inner cylinder and a stopper element on said outer cylinder co-acting with said projection on said inner cylinder so as to prevent said inner cylinder and outer cylinder from pulling apart, a rod guide fitted to said inner cylinder and having a center hole, a piston slidably fitted in sealing relationship in said inner cylinder and having a damping force generating hole, a piston rod connected with said piston and having its end part extending through said center hole of said rod guide to collide with the bottom surface of said outer cylinder and a compressive fluid enclosed in said inner cylinder, said inner cylinder being pressed into said outer cylinder so as to compress the fluid in said inner cylinder by the volume of the piston rod inserted in said inner cylinder when said inner cylinder engages said outer cylinder by said stopper, whereby on impact said piston and rod telescope into said inner cylinder thereby compressing said fluid.

2. A shock absorber according to claim 1 wherein the base end of said inner cylinder comprises an oil seal and a rod guide fixed to the inner cylinder with a snap ring.

3. A shock absorber according to claim 1 wherein a piston of a large diameter is formed on the outer periphery of said inner cylinder at the base end and extending to the middle part, said piston slidably fitted on said outer cylinder.

4. A shock absorber according to claim 1 wherein said fluid is a silicon oil.

* * * * *